United States Patent Office 3,068,072
Patented Dec. 11, 1962

3,068,072
HYDROXAMIC ACID CATALYZED HYDROLYSIS
Mary M. Demek, 1707 Patapsco St., Baltimore 30, Md.;
Gerard F. Endres, 12 De Winter Bldg., Netherlands
Village, Schenectady, N.Y.; and Joseph Epstein, 4020
Essex Road, Baltimore 7, Md.
No Drawing. Filed Apr. 8, 1960, Ser. No. 21,070
4 Claims. (Cl. 23—230)
(Granted under Title 35, U.S. Code (1952), sec. 266)

The invention described herein may be manufactured and used by or for the Government of the United States of America for governmental purposes without the payment to us of any royalty thereon.

This invention relates to the hydrolysis of esters of weak acids by hydroxamic acids and to the use of that hydrolysis in the detection and estimation of organophosphorous compounds, particularly certain compounds of high toxicity.

Hydroxamic acids have the formula:

wherein R is any one of numerous hydrocarbon and substituted hydrocarbon groups. It has been shown by Hackley et al., 77 Jour. Amer. Chem. Soc. 3651–3653, that hydroxamic acids accelerate the hydrolysis of organic fluorophosphates and fluorophosphonates, including the important toxic chemical warfare agent isopropyl methylphosphonofluoridate, also known as sarin or GB. In the course of the reaction the hydroxamic acid is destroyed.

We have found that hydroxamic acids also accelerate the hydrolysis of esters of weak acids, such as acetic acid. In contrast to the hydrolysis of organophosphorus compounds, this latter reaction does not involve the destruction of the hydroxamic acid, which acts as a catalyst. In dilute aqueous solutions, the hydrolysis is a first order reaction with respect to the ester. That is, the rate of hydrolysis is proportional to the concentration of the ester or:

$$-\frac{dc}{dt} = kc$$

where $c$ is the concentration, $t$ is time and $k$ is the reaction rate constant. We have found, also, that the value of the constant $k$ for a given ester under slightly alkaline conditions is a function of the hydroxamic acid concentration and may be used as a measure of that concentration.

The hydroxamic acids are exceptional as hydrolysis catalysts in that they produce hydrolysis under neutral or only slightly alkaline conditions at room temperature.

One ester that is readily hydrolyzed by use of the hydroxamic acids is 2-azobenzene-1-naphthyl acetate.

The hydrolysis produces acetic acid and the red dye 2-azobenzene-1-naphthol. The course of the reaction can be followed by measuring the increase in light absorption at a properly selected wavelength. We find that a wavelength of about .54 micron gives optimum results. In practical applications we have employed a Klett-Summerson photoelectric colorimeter, using a No. 54 filter. The absorption curves of the naphthol and its acetate are given in the article by Epstein, Demek and Wolff, Analytical Chemistry, vol. 29, pp. 1050–1053 (July 1957).

The reaction is:

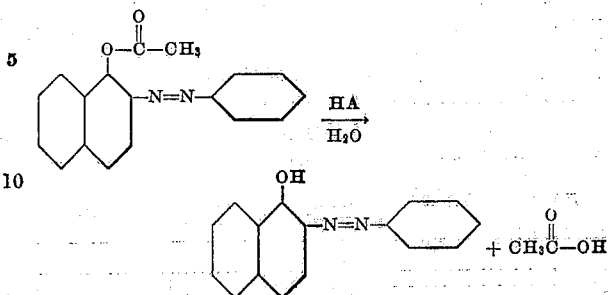

where HA indicates a hydroxamic acid.

EXAMPLE 1

The rate of appearance of color due to 2-azobenzene-1-naphthol was measured in a solution in which the solvent was a 25% solution of acetone in water buffered at pH 8.0. The solution was $5 \times 10^{-4}$ M with respect to 2-azobenzene-1-naphthyl acetate and hexanehydroxamic acid and the temperature was 25° C. It was established that the reaction was first order with respect to the acetate, the rate of destruction being 5% per minute by volume. The rate constant was therefore $5 \times 10^{-3}$ min.$^{-1}$.

Following almost complete destruction of the acetate, additional acetate was added which decomposed at the same rate (corrected for solvent effects). These experiments indicate that the hydroxamic acid concentration has remained constant and that the acid is therefore acting as a catalyst.

The hydrolysis of the acetate in the same solvent at pH 8.0 in 24 hours was negligible in the absence of a catalyst.

EXAMPLE 2

The experiments of Example 1 were repeated using a solvent which was 30% acetone, 70% water. The reaction rate constant was $2.6 \times 10^{-3}$ min.$^{-1}$.

EXAMPLE 3

An extended series of experiments was run. The following solutions were prepared:
(a) 2-azobenzene-1-naphthyl acetate, $6 \times 10^{-4}$ M in 100% acetone,
(b) Buffer, pH 9.0 (.001 M sodium borate in water),
(c) Hexanehydroxamic acid (HA) in water, various concentrations (see Table 1).

The reaction mixture was formed by mixing these solutions in the following quantities: 5 ml. HA solution, 1 ml. buffer solution, 4 ml. azobenzene solution. The mixture was allowed to stand for 5 minutes at 25°±0.5° C. and the reaction was then stopped by the addition of 0.5 ml. of 0.05 N HCl. The optical density was then read on the Klett-Summerson photoelectric colorimeter using the No. 54 filter (wavelength about 0.540 micron). The results are shown in Table 1. Each value given is an average of several determinations.

In the first column the hydroxamic acid concentration is given on the basis of 6 ml. (5 ml. HA solution plus 1 ml. buffer solution). The concentration in the entire reaction mixture is 0.6 times that given.

Table 1

| HA Conc., M×10⁻⁴ | Av. colorimetric reading | Net colorimetric Units | Colorimetric units HA×10⁻⁴ |
|---|---|---|---|
| 0 | 95±1 | | |
| 0.66 | 129±2 | 36 | 54.6 |
| 1.32 | 165±1 | 70 | 53.0 |
| 1.98 | 196±2 | 101 | 51.0 |
| 2.64 | 228±3 | 133 | 50.4 |
| 3.30 | 259±8 | 164 | 49.7 |
| Average | | | 51.7 |

EXAMPLE 4

The procedure of Example 3 was repeated employing more dilute solutions of hexane hydroxamic acid and allowing the mixture to stand for 50 minutes before stopping the reaction by the addition of HCl.

The results are shown in Table 2.

Table 2

| HA Conc., M×10⁻⁵ | Av. colorimetric reading | Net colorimetric Units | Colorimetric units HA×10⁻⁵ |
|---|---|---|---|
| 0 | 113±1.25 | | |
| 0.66 | 127±0.0 | 14 | 21.2 |
| 1.33 | 145.5±1.25 | 32.5 | 24.4 |
| 1.99 | 164±0.75 | 51.0 | 25.6 |
| 2.66 | 182±1.5 | 69.0 | 25.9 |
| 3.33 | 195±0.0 | 82.0 | 24.6 |
| Average | | | 24.6 |

It will be noted that the quantity of hydroxamic acid needed to produce the same increase in colorimeter reading is considerably less when the 50 minute reaction period is employed. Compare, for example, $1.32 \times 10^{-4}$ M in Table 1 and $2.66 \times 10^{-5}$ M in Table 2.

Organophosphorus fluoridates, such as isopropyl methylphosphonofluoridate, also known as sarin or GB, and diisopropylphosphorofluoridate (DFP) react rapidly with hydroxamic acids in dilute aqueous solution. In the course of the reactions which follow two moles of the acid should be destroyed by each mole of the fluoridate which reacts. Due, however, to a competing reaction producing isocyanates, the consumption of the hydroxamic acid is usually somewhat less than this. See Hackley et al., supra.

We have made the two reactions mentioned above, i.e., the reaction of the fluoridate with a hydroxamic acid and the hydrolysis of 2-azobenzene-1-naphthyl acetate, the basis for an analytical method for sarin. The steps of the method are as follows.

(1) The fluoridate is allowed to react with a known excess of a hydroxamic acid.

(2) The concentration of the unreacted hydroxamic acid is determined by adding 2-azobenzene-1-naphthyl acetate and measuring the rate of hydrolysis of the acetate as shown by the development of color.

(3) From the concentration of hydroxamic acid before and after the reaction with the fluoridate, the amount of fluoridate is determined.

EXAMPLE 5

The following solutions were prepared:

(a) 2-azobenzene-1-naphthyl acetate, $6 \times 10^{-4}$ M in 100% acetone.

(b) Buffer, pH 9.0 (.001 M sodium borate in water).

(c) Hexanehydroxamic acid (HA) $4.94 \times 10^{-4}$ M in water.

(d) Sarin (GB) in water, various concentrations (see Table 3).

(e) 0.05 N hydrochloric acid.

In the first step, one ml. of the HA solution and one ml. of the buffer were added to 4 ml. of the GB solution. The mixture was allowed to stand for 10 minutes at 25° C. Four ml. of the 2-azobenzene-1-naphthyl acetate solution was added, the mixture allowed to stand for five minutes and the reaction stopped by adding 0.5 ml. of the 0.05 N HCl. The optical density was read on the Klett-Summerson photoelectric colorimeter, using the No. 54 filter. The results are shown in Table 3.

In the first column, the sarin (GB) concentration is given on the basis of 6 ml. (four ml. GB solution, one ml. HA solution, one ml. buffer solution). The concentration in the original aqueous solution was 1.5 times that given.

The hydroxamic concentration is likewise given on the basis of the same 6 ml. volume.

The hydroxamic acid remaining (third column) was calculated from the data given in Table 1.

Table 3

| GB added M×10⁻⁵ | Av. colorimetric readings | HA remaining, M×10⁻⁴ | HA reacted, M×10⁻⁴ | HA reacted/GB added |
|---|---|---|---|---|
| 0 | 253±0.2 | 3.30 | | |
| 1.75 | 241±0.1 | 3.00 | 0.33 | 1.89 |
| 2.11 | 233±5.0 | 2.82 | 0.48 | 2.27 |
| 4.22 | 207±1.0 | 2.32 | 0.98 | 2.31 |
| 6.33 | 191±2.0 | 2.00 | 1.29 | 2.04 |
| 8.44 | 165±2.0 | 1.48 | 1.82 | 2.15 |
| Average | | | | 2.13 |

EXAMPLE 6

The procedure of Example 4 was repeated with the following variations.

The hexanehydroxamic acid reagent had a concentration of $5 \times 10^{-5}$ M.

The GB—HA mixture was allowed to stand for one hour at 25° C.

After addition of the 2-azobenzene-1-naphthyl acetate solution, the mixture was allowed to stand for 50 minutes.

The results are shown in Table 4.

Table 4

| GB added M×10⁻⁶ | Av. colorimetric readings | HA remaining, M×10⁻⁵ | HA reacted, M×10⁻⁵ | HA reacted/GB added |
|---|---|---|---|---|
| 0 | 186 | 3.33 | | |
| 2.133 | 176 | 2.92 | 0.411 | 1.93 |
| 4.266 | 165 | 2.47 | 0.864 | 2.03 |
| 6.340 | 141 | 1.48 | 1.85 | 2.92 |
| 8.533 | 120 | 0.59 | 2.72 | 3.18 |
| 10.66 | 111 | 0.24 | 3.09 | 2.90 |

In the practical use of this method, for the determination of concentrations of sarin or similar substances, standardized procedures such as those given in Examples 3 and 4 are carried out and curves are constructed plotting, e.g., "GB added" against "colorimeter reading." The concentration of the unknown can then be determined directly from the colorimeter reading.

We claim:

1. A method of determining the concentration in aqueous solution of hexane hydroxamic acid which comprises adding to said solution 2-azobenzene-1-naphthyl acetate, allowing said solution to stand a fixed length of time and then measuring the optical density of said solution at a wavelength of the order of 0.540 micron.

2. A method for determining the concentration in dilute aqueous solution of a compound selected from the class consisting of phosphonofluoridates and phosphorofluoridates which comprises adding to said solution an amount of a lower alkyl hydroxamic acid in excess of that required to react with the amount of said compound believed to be present, allowing said solution to stand for a length of time sufficient for said compound and said acid to react, adding a measured amount of 2-azobenzene-1-naphthyl acetate to said solution, allowing said solution to stand for a fixed length of time, and measuring the optical density of said solution at a wavelength at which 2-azobenzene-1-naphthol has a high light absorption relative to 2-azobenzene-1-naphthyl acetate.

3. A method of determining the concentration of the compound isopropyl methylphosphonofluoridate in dilute aqueous solution which comprises adding to said solution a known amount of hexanehydroxamic acid in excess of that required to react with the amount of said compound believed to be present, allowing said solution to stand for a sufficient length of time for said acid and said compound to react, adding 2-azobenzene-1-naphthyl acetate to said solution and allowing said solution to stand for a fixed length of time and measuring the optical density of said solution at a wavelength at which 2-azobenzene-1-naphthol has a high light absorption relative to 2-azobenzene-1-naphthyl acetate.

4. A method of determining the concentration of a lower alkyl hydroxamic acid in aqueous solution which comprises adding a measured amount of 2-azobenzene-1-naphthyl acetate to said solution and determining the rate of hydrolysis by measuring the optical density of said solution at a wavelength at which 2-azobenzene-1-naphthol has a high light absorption relative to that of 2-azobenzene-1-naphthyl acetate.

References Cited in the file of this patent

Hackley et al.: Jour. Am. Chem. Soc., vol 77, pages 3651–3653 (1955).

Epstein: Analytical Chemistry, vol. 29, pages 1050–1953 (1957).